US006854481B2

(12) United States Patent
Liao

(10) Patent No.: US 6,854,481 B2
(45) Date of Patent: Feb. 15, 2005

(54) POWER STEERING FLUID REFILLING AND DRAINING DEVICE

(75) Inventor: Po-Lin Liao, Taichung (TW)

(73) Assignee: Lih Yann Co., Ltd., Taichung (TW)

( * ) Notice: Subject to any disclaimer, the term of this patent is extended or adjusted under 35 U.S.C. 154(b) by 196 days.

(21) Appl. No.: 10/348,415

(22) Filed: Jan. 21, 2003

(65) Prior Publication Data

US 2004/0140008 A1 Jul. 22, 2004

(51) Int. Cl.[7] .............................. B65B 3/04; G05D 7/00

(52) U.S. Cl. ............................ 137/565.31; 137/565.01; 141/65; 184/1.5

(58) Field of Search ......................... 137/565.31, 565.3, 137/563, 565.01; 141/65, 59, 98; 184/1.5

(56) References Cited

U.S. PATENT DOCUMENTS 6,167,907 B1 * 1/2001 Liaw ..................... 137/565.17
6,588,441 B1 * 7/2003 Rome et al. ................... 137/1
6,688,340 B1 * 2/2004 Awad .......................... 141/65
6,772,802 B2 * 8/2004 Few ............................ 141/65
6,772,803 B2 * 8/2004 Awad .......................... 141/65
6,779,633 B2 * 8/2004 Viken ......................... 184/1.5

* cited by examiner

*Primary Examiner*—Kevin Lee

(57) ABSTRACT

A power steering fluid refilling and draining device according to the present invention includes a frame mounting with a fresh fluid tank including an output pipe connected to a first three-way valve and a refilling port. The frame further houses a used fluid tank including a sucking pipe connected to a second three-way valve and a sucking port. A pneumatic pump is interconnected to the output pipe and the sucking pipe, respectively. Wherein when the pneumatic pump is operated, the fresh fluid will be delivered into a steering system with used fluid therein being sucked out by the sucking port simultaneously. Each of the fresh fluid tank and the used fluid tank is provided with a window.

5 Claims, 5 Drawing Sheets

POWER STEERING FLUID REFILLING AND DRAINING DEVICE

FIELD OF THE INVENTION

The present invention relates to a refilling and draining device, and more particularly to a refilling and draining device for power steering system of a vehicle.

DESCRIPTION OF THE PRIOR ART

Modern technological development has brought up a great improvement to our daily life. For example, the presence of vehicle, especially the so-called family car, provides us a comfortable, convenient daily life. In addition, more and more luxury device, such as the power steering system, which was once an option for high-class vehicle, has now become a standard option for all kind of vehicles.

The power steering works by pumping pressurized fluid into a steering system so as to reduce the steering force needed for turning a vehicle. By the provision of the steering system, the drivers can easily handle the vehicle, especially when park the vehicle in a parking lot.

However, the power steering fluid has to be replaced after a period of usage as the moisture contained within the fluid will deteriorate the physical property of the fluid. As such, the function of the steering system will be negatively influenced.

Conventionally, replacing the used fluid within the steering system is simply conducted by draining out the used fluid from the outlet, and then refilling the new fluid through the inlet. However, this creates a problem as air will be trapped in the steering system when the fresh fluid pours into the steering system. The trapped air will decrease the overall pressure within the system. This will create a dangerous situation as the driver believes that he/she has rotated the steering wheel enough, while the trapped air neutralizes portion of it.

U.S. Pat. No. 6,167,907 issued to the same assignee discloses a Power Transfer System for refilling and replacing the used fluid in the steering system. Even it works to a certain extent, it is unlikely to meet the modern requirements.

U.S. patent application Ser. No. 10/208,600 filed by the same assignee relates to an improvement relates to the same field. However, the ’600 application is directed to the improvement of pump, while is not the circuit of the system. As such, providing a brand new system with improved circuit will benefit the replacing and refilling process.

SUMMARY OF THE INVENTION

It is the object of this invention to provide a power steering fluid refilling and draining device in which the refilling of the fresh fluid and drainage of the used fluid can be performed simultaneously.

A power steering fluid refilling and draining device according to the present invention includes a frame mounting with a fresh fluid tank including an output pipe connected to a first three-way valve and a refilling port. The frame further houses a used fluid tank including a sucking pipe connected to a second three-way valve and a sucking port. A pneumatic pump is interconnected to the output pipe and the sucking pipe, respectively. Wherein when the pneumatic pump is operated, the fresh fluid will be delivered into a steering system with used fluid therein being sucked out by the sucking port simultaneously. Each of the fresh fluid tank and the used fluid tank is provided with a window.

DETAILED DESCRIPTION OF PREFERRED EMBODIMENT

Figure 1:
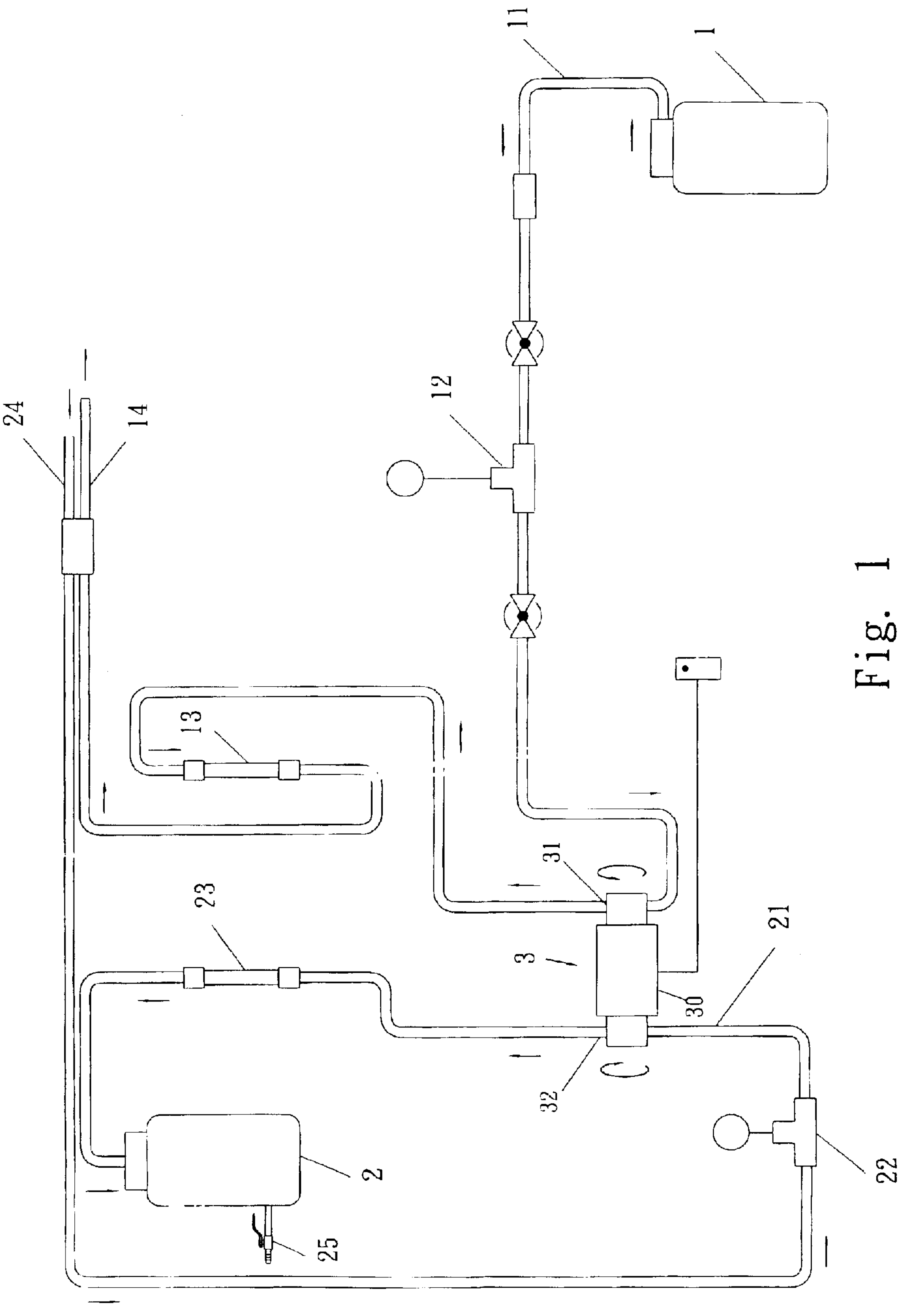
FIG. 1 is a circuitry system of the power steering fluid refilling and draining device in accordance with the present invention.
Figure 2:
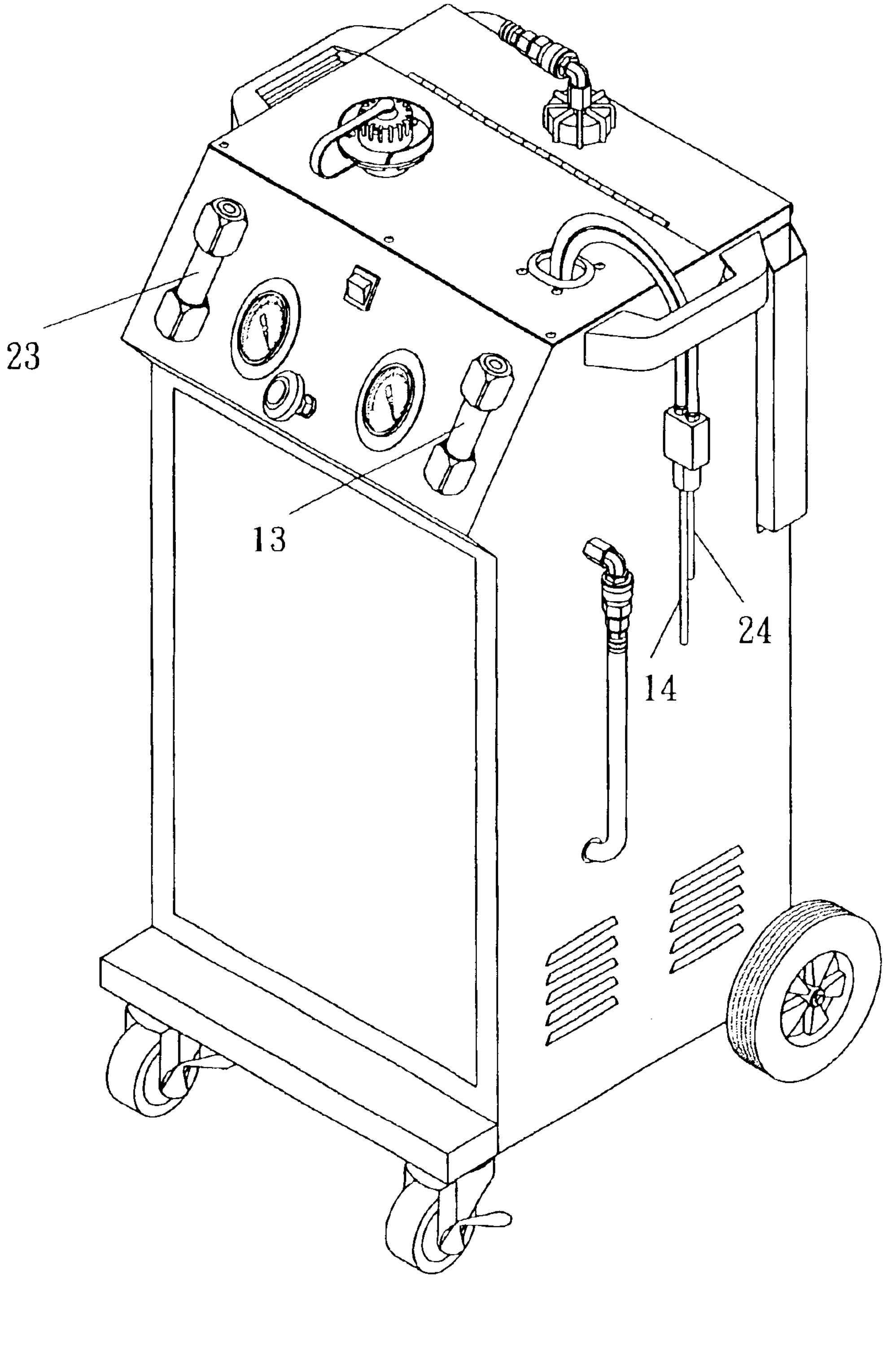
FIG. 2 is a perspective view of the device.
Figure 3:
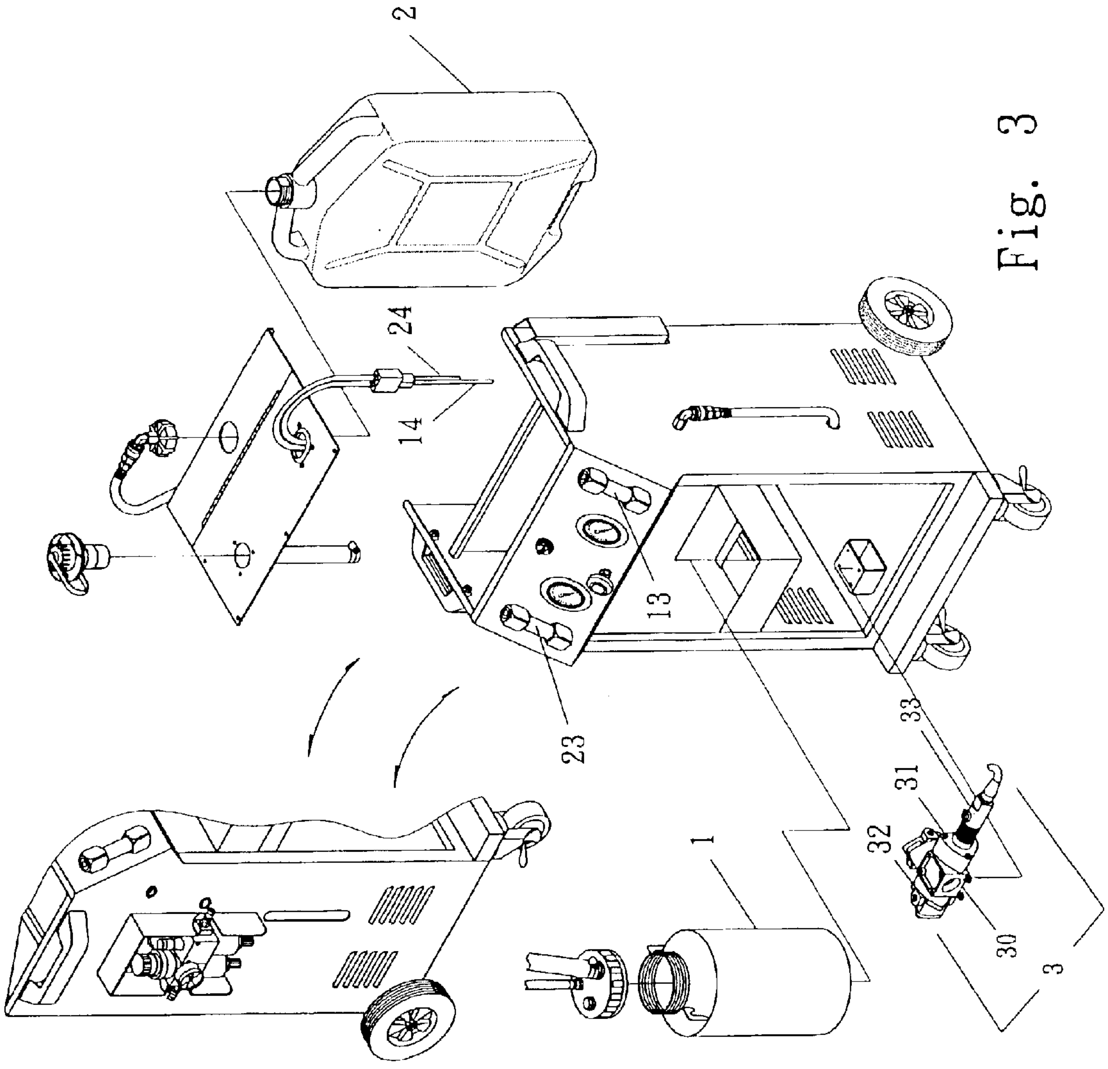
FIG. 3 is an exploded perspective view of FIG. 2.
Figure 4:
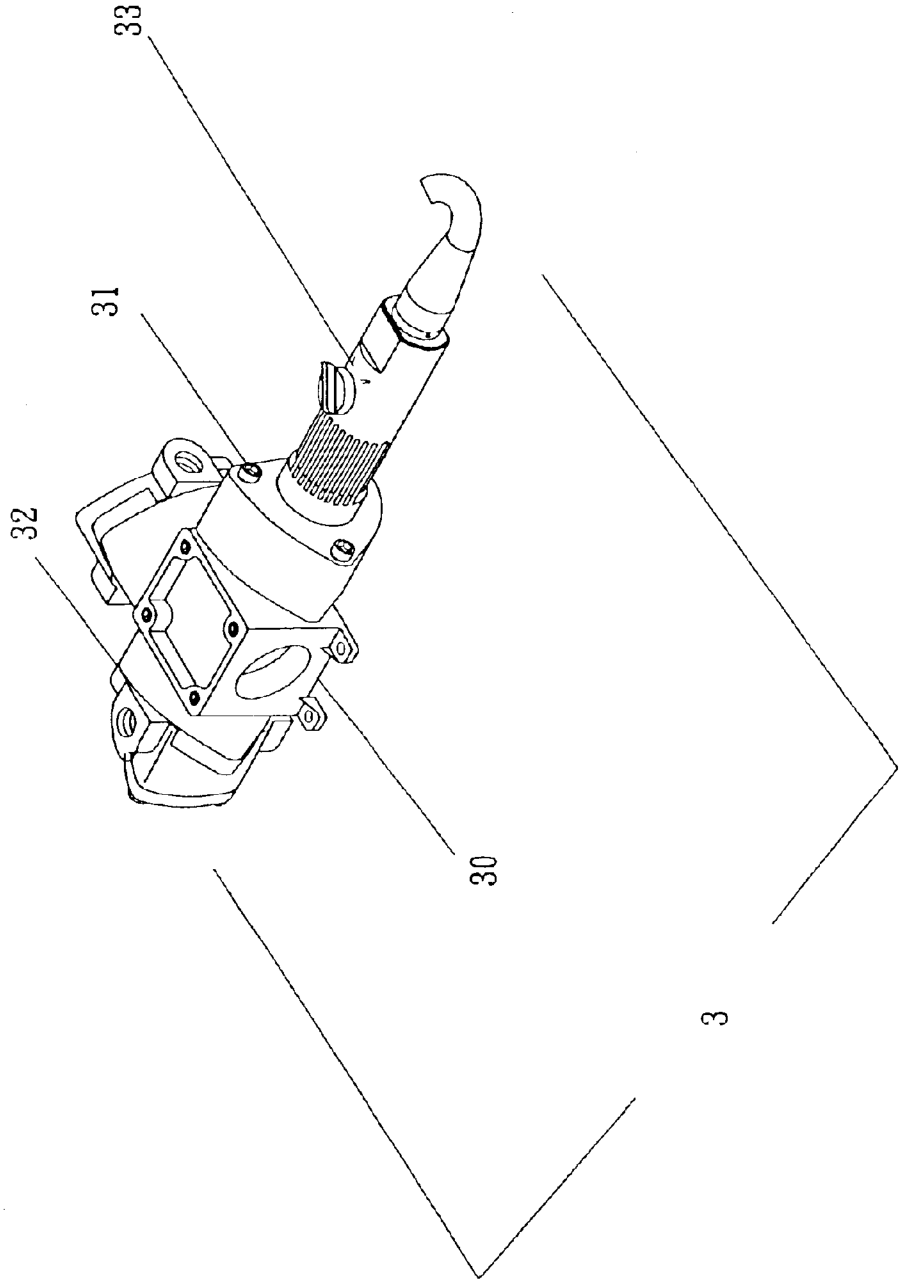
FIG. 4 is a perspective view of a dual shaft pneumatic pump used in the device.

Referring to FIG. 1, the circuitry system of a power steering fluid refilling and draining device in accordance to the present invention includes a fresh fluid tank 1, a used fluid tank 2 and a dual-shaft pneumatic pump 3 interconnected to the fresh fluid tank 1 and the used fluid tank 2. The fresh fluid tank 1 includes an output pipe 11 connected to a first three-way valve 12 and a first window 13. The output pipe 11 is further connected to a first connecting port 31 of the pump 3. The output pipe 11 further includes a refilling port 14.

The used fluid tank 2 includes a sucking pipe 21 which is further interconnected with a second three-way valve 22 and a second window 23. The sucking pipe 21 is connected to a second port 32 of the pump 3 and is further extending with a sucking port 24. The used fluid tank 2 is further includes a drainage pipe 25 for draining out the used fluid contained in the used fluid tank 2.

In operation, the refilling port 14 and the sucking port 24 are arranged to an inlet and an outlet of the steering system (not shown), respectively. Afterward, the pneumatic pump 3 is powered by a pneumatic machine 33 so as to operate the pneumatic pump 3. By this arrangement, while the sucking port 24 sucks out the used fluid from the outlet of the steering system, the refilling port 14 pours the fresh fluid into the inlet of the steering system. The draining and refilling occurs simultaneously.

The used fluid flows from the sucking port 24 into the sucking pipe 21, and finally enters the used fluid tank 2, while the fresh fluid flows from the pipe 11 and the refilling portion 11 into the steering system. As a result, the draining of the used fluid and refilling of new fresh fluid can be done simultaneously thereby avoiding the air trap within the steering system.

Figure 5:
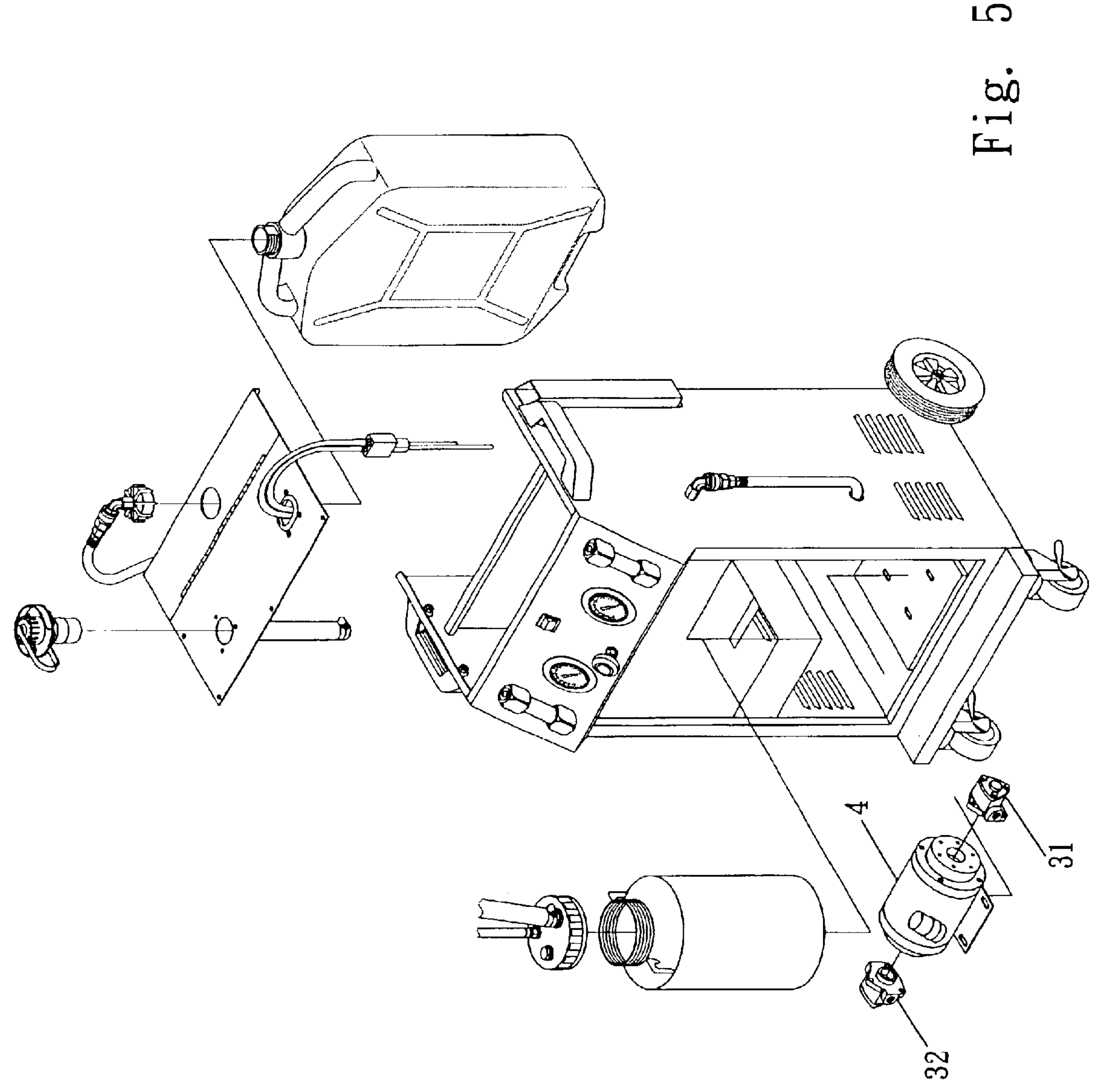
FIG. 5 is an operational circuitry of the invention for working with a motor.

As shown in FIG. 5, the power steering fluid refilling and draining device in accordance with the present invention can be powered by a motor 4 connected to the first and second connecting ports 31, 32 of the dual-shaft pneumatic pump 3. By this arrangement, the device according to the present invention can also work on the environment without compressed air.

I claim:

1. A power steering fluid refilling and draining device, comprising a frame;

a fresh fluid tank including an output pipe connected to a first three-way valve and a refilling port;

a used fluid tank including a sucking pipe connected to a second three-way valve and a sucking port;

a pneumatic pump interconnected to the output pipe and the sucking pipe, respectively, wherein when the pneumatic pump is operated, the fresh fluid will be delivered into a steering system with used fluid therein being sucked out by the sucking port simultaneously.

2. The device as recited in claim 1, wherein the fresh fluid tank further includes a first window interconnected to the first three-way valve.

3. The device as recited in claim 1, wherein the used fluid tank further includes a second window interconnected to the second three-way valve.

4. The device as recited in claim 1, wherein the pneumatic pump includes dual shafts for simultaneously working on two different fluids.

5. The device as recited in claim 1, wherein a motor can be connected to the first and second ports for operating the device.

* * * * *